(12) United States Patent
Parker et al.

(10) Patent No.: US 10,649,787 B2
(45) Date of Patent: May 12, 2020

(54) EXCEPTION HANDLING INVOLVING EMULATION OF EXCEPTION TRIGGERING DATA TRANSFER OPERATION USING SYNDROME DATA STORE THAT INCLUDES DATA VALUE TO BE TRANSFERRED

(71) Applicant: ARM LIMITED, Cambridge, Cambridgeshire (GB)

(72) Inventors: Jason Parker, Sheffield (GB); Richard Roy Grisenthwaite, Cambridge (GB)

(73) Assignee: ARM Limited, Cambridge (GB)

(*) Notice: Subject to any disclaimer, the term of this patent is extended or adjusted under 35 U.S.C. 154(b) by 22 days.

(21) Appl. No.: 15/759,907

(22) PCT Filed: Sep. 9, 2016

(86) PCT No.: PCT/GB2016/052784
§ 371 (c)(1),
(2) Date: Mar. 14, 2018

(87) PCT Pub. No.: WO2017/064453
PCT Pub. Date: Apr. 20, 2017

(65) Prior Publication Data
US 2018/0239607 A1  Aug. 23, 2018

(30) Foreign Application Priority Data
Oct. 14, 2015  (GB) .................................. 1518165.4

(51) Int. Cl.
*G06F 9/38* (2018.01)
*G06F 9/455* (2018.01)
(Continued)

(52) U.S. Cl.
CPC ........ *G06F 9/3865* (2013.01); *G06F 9/30043* (2013.01); *G06F 9/30098* (2013.01); *G06F 9/3861* (2013.01); *G06F 9/45533* (2013.01)

(58) Field of Classification Search
CPC ............... G06F 9/3865; G06F 9/45533; G06F 9/30098; G06F 9/30043; G06F 9/3861;
(Continued)

(56) References Cited

U.S. PATENT DOCUMENTS 5,327,567 A * 7/1994 Johnson ................ G06F 9/3861
703/26
5,751,945 A * 5/1998 Levine ................ G06F 11/3409
714/47.2
(Continued)

FOREIGN PATENT DOCUMENTS

GB  2460280  11/2009

OTHER PUBLICATIONS

Sfezer, J et al. Architectural Support for Hypervisor-Secure Virtualization. Proceedings of ASPLOS XVII, 2012, p. 437-450 [online], retrieved Jul. 16, 2019. Retrieved from the Internet <URL: https://dl.acm.org/citation.cfm?id=2151022> <DOI=http://dx.doi.org/10.1145/2150976.2151022>.*
(Continued)

*Primary Examiner* — William B Partridge
*Assistant Examiner* — Shawn Doman
(74) *Attorney, Agent, or Firm* — Nixon & Vanderhye, P.C.

(57) ABSTRACT

A data processing system includes exception handling circuitry to detect attempted execution of an exception-triggering processing operation which includes transfer of a data value with a given register of a register bank. Upon detection of such an exception-triggering processing operation, syndrome data is stored within a syndrome register characterising the exception-triggering processing operation with that syndrome data including the data value. The value may be stored into the syndrome register upon occurrence of the exception in the case of an aborting write instruction. The
(Continued)

data value may be stored into the syndrome register by emulating code triggered by exception in the case of an aborting read instruction.

19 Claims, 3 Drawing Sheets

(51) Int. Cl.
*G06F 9/30* (2018.01)
*G06F 11/07* (2006.01)

(58) Field of Classification Search
CPC ............... G06F 9/3863; G06F 9/45558; G06F 11/0772; G06F 11/0793; G06F 2009/45587; G06F 2009/45575
USPC .............................................. 712/244; 718/1
See application file for complete search history.

(56) References Cited

U.S. PATENT DOCUMENTS

| | | | |
|---|---|---|---|
| 6,189,093 B1 | 2/2001 | Ekner et al. | |
| 6,615,343 B1* | 9/2003 | Talcott | G06F 9/3842 |
| | | | 712/244 |
| 6,904,517 B2* | 6/2005 | Nevill | G06F 9/462 |
| | | | 712/228 |
| 8,135,894 B1* | 3/2012 | Ball | G06F 13/26 |
| | | | 710/264 |
| 9,317,452 B1* | 4/2016 | Forschmiedt | G06F 12/1458 |
| 2005/0177666 A1* | 8/2005 | Kimelman | G06F 9/4818 |
| | | | 710/200 |
| 2006/0156074 A1* | 7/2006 | Kumar | G06F 11/3644 |
| | | | 714/51 |
| 2006/0251092 A1* | 11/2006 | Matterne | G06F 9/3877 |
| | | | 370/412 |
| 2007/0005858 A1* | 1/2007 | Shah | G06F 13/24 |
| | | | 710/200 |
| 2008/0155167 A1* | 6/2008 | Mansell | G06F 13/24 |
| | | | 711/6 |
| 2008/0216073 A1* | 9/2008 | Yates | G06F 9/30174 |
| | | | 718/100 |
| 2010/0094613 A1* | 4/2010 | Biles | G06F 9/45558 |
| | | | 703/24 |
| 2012/0260073 A1* | 10/2012 | Henry | G06F 9/30174 |
| | | | 712/221 |
| 2013/0185720 A1* | 7/2013 | Tuch | G06F 12/023 |
| | | | 718/1 |
| 2015/0261590 A1* | 9/2015 | Sperber | G06F 11/0721 |
| | | | 714/42 |
| 2015/0347137 A1* | 12/2015 | Gschwind | G06F 9/30058 |
| | | | 712/239 |
| 2016/0239209 A1* | 8/2016 | Malyugin | G06F 12/023 |

OTHER PUBLICATIONS

International Search Report and Written Opinion of the ISA for PCT/GB2016/052784, dated Dec. 16, 2016, 10 pages.
Search Report for GB1518165.4, dated Apr. 14, 2016, 4 pages.
Pfoh et al., "Exploiting the x86 Architecture to Derive Virtual Machine State Information", Emerging Security Information Systems and Technologies (Secureware), Jul. 18, 2010, pp. 166-175.
Office Action in corresponding European Application No. 16 766 055.4-1203 dated Feb. 5, 2020, 4 pages.

* cited by examiner ions to at least partially emulate said exception-
EXCEPTION HANDLING INVOLVING EMULATION OF EXCEPTION TRIGGERING DATA TRANSFER OPERATION USING SYNDROME DATA STORE THAT INCLUDES DATA VALUE TO BE TRANSFERRED This application is the U.S. national phase of International Application No. PCT/GB2016/052784 filed 9 Sep. 2016, which designated the U.S. and claims priority to GB Patent Application No 1518165.4 filed 14 Oct. 2015, the entire contents of each of which are hereby incorporated by reference.

This disclosure relates to the field of data processing systems. More particularly, this disclosure relates to exception handling within data processing systems.

It is known that during operation of a data processing system exception conditions may arise requiring exception processing to be performed, such as data aborts, undefined instructions, etc. When such an action is detected, the execution of exception handling program instructions may be triggered.

One circumstance in which exception processing arises is in the context of virtualised systems. A hypervisor program may be providing a virtual execution environment for a guest operating system and application programs. The guest operating system or application program may attempt a data access that is trapped as an exception and then emulated by the hypervisor. In order that the hypervisor may emulate the data access, it requires access to the state of the guest system. However, in some circumstances, it may be desired for security reasons that the hypervisor not be permitted to access the state of the guest system as the guest system contains private/secret/secure data.

At least some of the embodiments of the disclosure provide apparatus for processing data, comprising:
a plurality of registers;
exception handling circuitry to detect attempted execution of an exception-triggering processing operation including a transfer of a data value with a given register of said plurality of registers and to trigger execution of exception handling program instructions to at least partially emulate said exception-triggering processing operation; and
a syndrome data store to store syndrome data characterising said exception-triggering processing operation and including said data value; wherein
said exception handling circuitry performs said transfer with said given register using said data value within said syndrome data.

At least some of the embodiments of the disclosure provide apparatus for processing data, comprising:
a plurality of register means for storing data;
exception handling means for detecting attempted execution of an exception-triggering processing operation including a transfer of a data value with a given register means of said plurality of register means and for triggering execution of exception handling program instructions to at least partially emulate said exception-triggering processing operation; and
syndrome data storage means for storing syndrome data characterising said exception-triggering processing operation and including said data value; wherein
said exception handling means performs said transfer with said given register means using said data value within said syndrome data.

At least some of the embodiments of the disclosure provide a method of processing data, comprising:
storing data within a plurality of registers;
detecting attempted execution of an exception-triggering processing operation including a transfer of a data value with a given register means of said plurality of registers;
triggering execution of exception handling program instructions to at least partially emulate said exception-triggering processing operation; and
storing syndrome data characterising said exception-triggering processing operation and including said data value; and
performing said transfer with said given register means using said data value within said syndrome data.

Example embodiments will now be described, by way of example only, with reference to the accompanying drawings in which:

FIG. 1 schematically illustrates a data processing system;

Figure 1:
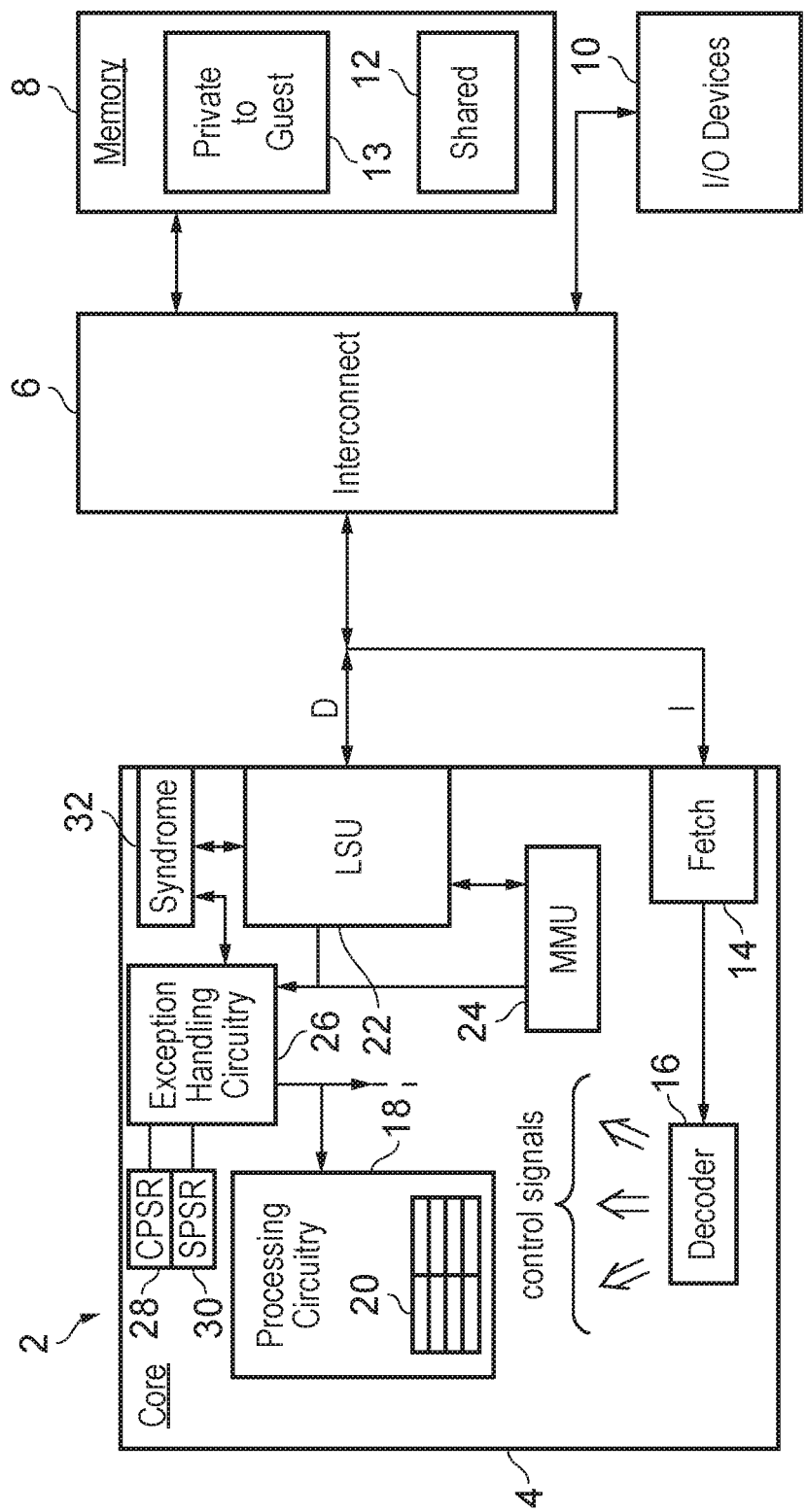

FIG. 1 schematically illustrates a data processing system 2 including a processor core 4 connected via interconnect circuitry 6 to a memory 8 and one or more memory-mapped input/output devices 10. The memory 8 includes one or more private regions 13 storing data which is private to a guest program executing in a virtualised environment using the processor core 4. The memory 8 further includes one or more shared regions 12 which are shared between the guest program and a virtualisation program providing the virtualised execution environment to the guest program. The virtualisation program may, for example, be a hypervisor program and the guest program may be a guest operating system program, which itself provides a virtualised execution environment to one or more application programs.

The processor core 4 includes an instruction fetch unit 14, which fetches program instructions to be executed from the memory 8 and supplies these to a decoder 16 where the program instructions are decoded to generate control signals which then control other circuitry within the processor core 4 to perform the processing operation specified by the decoded program instructions. The processor core 4 includes processing circuitry 18 including a register bank 20 (comprising a plurality of general purpose registers) to perform processing operations such as arithmetic operations and logic operations. A load store unit 22 is used to perform memory access operations such as load operations in response to a load instruction (LDR) whereby a data value is read from the memory 8 and stored into a register of the register bank 20. The load store unit 22 also performs store operations specified by store instructions (STR) in which data values are read from registers of the register bank 20 and stored into memory addresses within the memory 8. There may be variants of these load and store instructions. The input/output devices 10 are memory-mapped and so load instructions and store instructions may be used to read data values from the input/output devices 10 and store these into registers within the register bank 20. Store operations may similarly be used to read values from the register bank 20 and write these to the input/output devices 10.

A memory management unit 24 uses page table data stored within the memory 8 to manage access to the memory address space (including the memory 8 and the input/output devices 10) by the memory access instructions executed on the processor core 4. The memory management unit 24 detects when a memory access is attempted which violates access permissions, or is otherwise not permitted. This gives rise to a data abort. Exception handling circuitry 26 is responsive to the data abort indicated by the memory management unit 24 to trigger exception handling. The exception handling response may include following an exception vector indicating the start address of exception handling program instructions to commence execution of those exception handling program instructions (e.g. load the vector address to the program counter). Furthermore, the exception handling circuitry 26, as part of the exception response, may save status data representing a current processing state of the processor core 4 as held in a CPSR register 28 (current program status register) into a SPSR register 30 (saved program status register) from where the status data may be restored when the exception handling has completed and return is made to the initial program flow. A syndrome register 32 is coupled to the exception handling circuitry 26 and stores data characterising an exception-triggering processing operation (at least for some memory accesses) which lead to the exception being handled by the exception handling circuitry 26. In some embodiments more than one syndrome register may be used. The syndrome register(s) is an example of a syndrome data store. In the case of a data abort, the syndrome data includes, for example: an address within the memory address space associated with the memory access that has aborted, a flag indicating whether the memory access was a write to that memory address or a read from that memory address, a size value indicating the size of the data value being accessed (e.g. byte, half word, word, double word, etc.). Furthermore, in the case of aborted memory access which was a write to a memory address within the memory address space, then the syndrome register contains the data value that was to be written. This data value may be supplied from the load store unit 22 to the syndrome register 32. In the case where the aborted memory access was a read of a data value from the memory address space, then the syndrome register 32 contains space into which that data value may be stored by the exception handling program instructions (performing exception handling processing operations) such that when the aborted memory access instruction is replayed, the read data value can be recovered from the syndrome register 32 and returned to the load store unit 22 and the processor core 4 (e.g. returned into the appropriate register of the register bank 20).

The data processing system 2 supports virtualisation whereby a hypervisor program provides a virtualised execution environment to one or more guest operating system programs and application programs. In order to enhance security of the system, the memory access data held by the memory management unit 24 may serve to deny the hypervisor the ability to access data associated with the guest program, such as data stored within private regions 13 belonging to that guest program. The data stored within the register bank 20 during execution of the guest programs and other state data associated with the guest programs (e.g. CPSR data, state configuration data etc.) may also be kept private to the guest program. The hypervisor program operates to trap memory access by the guest programs to certain memory addresses, such as the memory-mapped input/output devices 10. The hypervisor program emulates such trapped memory accesses on behalf of the guest programs using exception handling program instructions to perform exception handling processing operations. As an example, guest program may seek to perform a write of a data value to a memory mapped input/output device. The memory management unit 24, using its page table data, detects that the write access is one to be trapped and emulated by the hypervisor program and accordingly raises a data abort exception which is passed to the exception handling circuitry 26. The exception handling circuitry 26 saves data characterising the aborted write into the syndrome register 32. This data characterising the write includes a flag indicating that the aborted operation is a write operation, the address of the attempted write operation, the data value to be written by the attempted write operation, the size of the data value to be written, and further data (such as the replay state data discussed below) as may be useful in emulating the aborted write operation. The exception handling circuitry also stores the current program status register contents 28 into the saved program status register 30. The contents of the syndrome register 32 prior to the aborted write operation constitute part of the current program state and accordingly are also saved as part of the exception handling. Should a further exception arise during the emulation of the aborted memory access, then the current syndrome data at that time will similarly be saved as part of the current program status data so that it can be restored as the exceptions unwind.

Exception handling program instructions triggered by the data abort of the attempted write operation serve to read the syndrome data from the syndrome register 32 and use this data to complete the intended write operation. This completion may involve, for example, translating an address of the write specified by the guest program into a different address to be used by the exception handling program instructions which operate as part of the hypervisor program and which correspond to the physical address of the memory mapped input output devices 10 as managed by the hypervisor program.

In the case that the aborted memory access instruction that is trapped and emulated by the exception handling program instructions was a read of a data value from the memory mapped input/output devices 10, the exception handling program instructions read from the syndrome register 32 a memory address to be read and then perform that read from the appropriate memory address as managed by the hypervisor program. The data value returned from this read is stored into the syndrome register 32 as part of the syndrome data.

When the guest program is restarted upon return from the exception processing, then the aborting memory access instruction (whether a write or a read) is issued for re-execution. In the case of a read, then the data value stored within the syndrome register 32 by the exception processing which emulated that read is then returned as a result of that read, e.g. stored into the appropriate destination register of the register bank 20 as specified by the original read instruction. In the case of re-executing a write instruction, the emulating exception processing program instructions will have already performed the write operation specified in behalf of the guest program and so the write program instruction may be completed (retired) without further action being necessary.

The syndrome register 32 stores as part of the syndrome data replayed state data. This replayed state data may be a flag having either a first state or a second state. The replayed state data is used to indicate that an aborting memory access instruction has already been emulated when execution of that memory access instruction is attempted again. Thus, when an aborting memory access instruction is first encountered within the program flow of the guest program, it triggers exception processing and is emulated by the exception handling program instructions. As part of the emulation, the replay state data (which may be part of the syndrome data or held elsewhere) is set to a first state. When the emulation has been completed, and execution of the aborting memory access instruction is attempted again, the exception handling circuitry 26 detects that the replay state data has the first state and accordingly detects that the aborting memory access has already been emulated. If the aborting memory access is a write, then the exception handling circuitry 26 can simply mark that write as completed as the emulation that was previously performed has already performed the desired write. In the case that the aborting memory access is a read, then the syndrome register 32 contains the data value returned for that read by the emulating exception handling program instructions. In this case, the exception handling circuitry 26 uses that data value from the syndrome register 32 and supplies it as the result of the data read (e.g. transfers the read data from the syndrome register 32 to the appropriate destination register within the register bank 20 specified by the aborting read instruction) and then processes the read instruction as complete.

Figure 2:
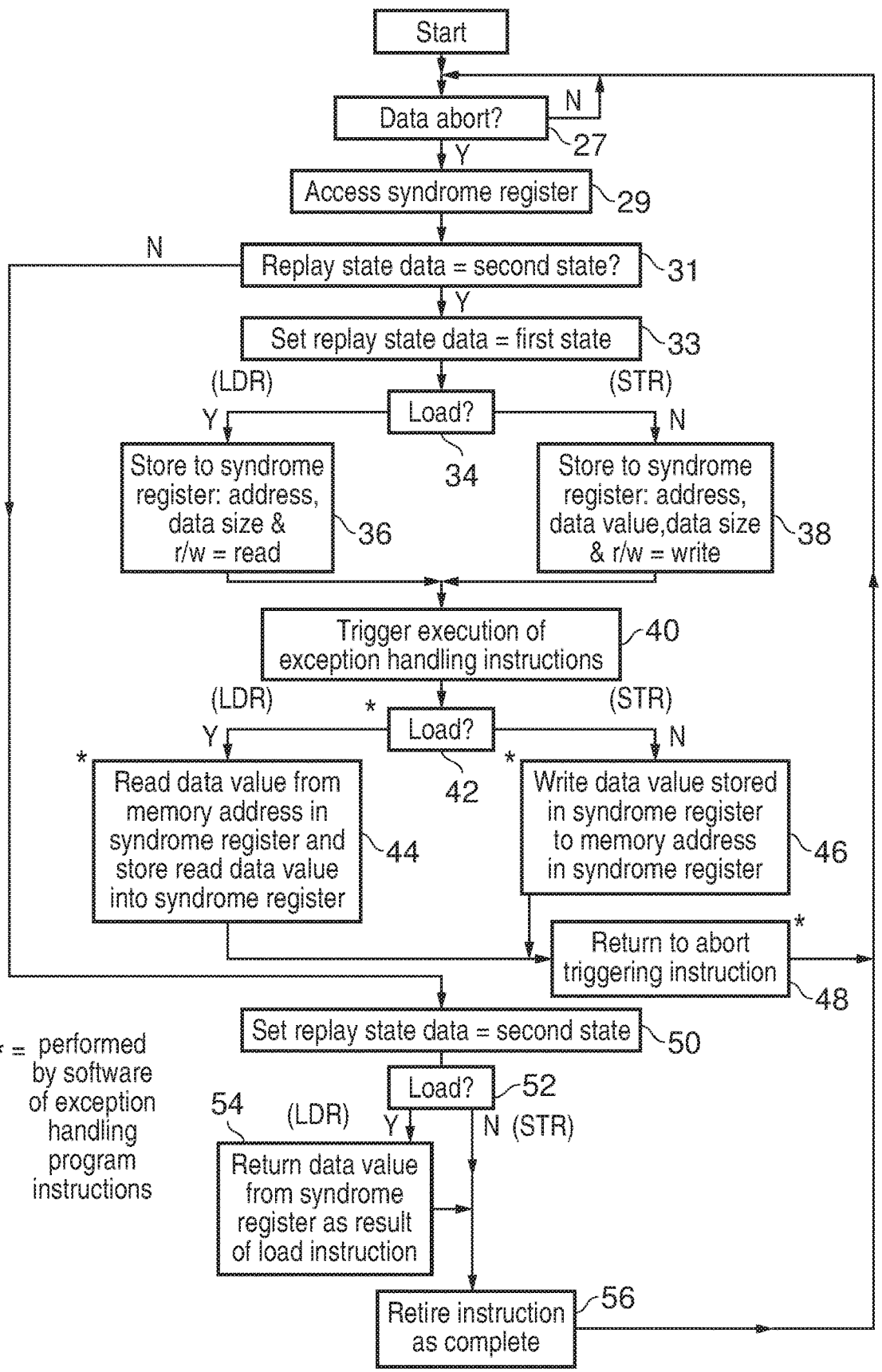
FIG. 2 is a flow diagram schematically illustrating exception handling.

FIG. 2 is a flow diagram schematically illustrating exception handling data aborts. At step 27 processing waits until a data abort arises. Other types of exception may be handled in a different way. When a data abort arises, the exception handling circuitry 26 at step 29 serves to access the syndrome data register 32. Step 31 determines whether or not the replay state data accessed within the syndrome register 32 has a second state. If the replay state data has the second state, then this indicates that the aborting memory access instruction has not already been emulated.

If the replay state data has the second state, then step 33 sets the replay state data to the first state such that when the aborting memory access is encountered again then it may be detected that it has already been emulated. Step 34 determines whether the aborting memory access is a load instruction. If the aborting memory access is a load instruction, then step 36 serves to store into the syndrome register 32, as part of the syndrome data characterising that load instruction, data including the memory address that is the target of the load instruction, the data size of the load instruction and a flag indicating that the aborting memory access is a read. If determination at step 34 is that the aborting memory access is a store instruction (i.e. not a load), then step 38 serves to store into the syndrome register 32 as part of the syndrome data, a target address of the store instruction, the data value to be written as part of the store instruction, the data size of the data value as well as a flag indicating that the aborting memory access was a write.

Following both steps 36 and 38, step 40 serves to trigger execution of exception handling instructions. This triggering may take the form of following an exception vector set up as part of the configuration of the data processing system 2 in respect of data aborts, with this vector being used to set the program counter value such that execution of the exception handling program instructions is commenced.

Step 42 is performed by the exception handling program instructions and determines whether the abort instruction is a load. This determination may be performed by examining the read/write flag within the syndrome data stored in the syndrome register 32 as set at steps 36 and 38. If the aborting memory access being emulated is a load, then step 44 serves to emulate that load by reading the data value from the memory address in the syndrome register (or a translated version of that memory address), storing the read data value returned from the data read back into the syndrome register 32, and performing any further actions necessary to complete the emulation of the aborted read operation. If the determination at step 42 is that the aborted memory access to be emulated is a store operation, then step 46 serves to complete that store operation by writing the data value stored in the syndrome register 32 to the memory address (or a translated version of that memory address) as indicated by the memory address stored within the syndrome register 32.

Following both steps 44 and 46, processing proceeds to step 48 at which a return from the exception is performed by returning to the abort triggering program instruction. It will be appreciated that the exception handling program instructions may perform other operations during the exception handling and emulation operation, such as dealing with the storing of other program state and the restoring of that program state.

Subsequent to step 48, processing returns to step 27. As step 48 has returned processing to the abort triggering instruction (aborting memory access within the guest program), then step 27 will detect that this instruction again aborts as a consequence of the same protection by the memory management unit 24. In this case, the determination at step 30 will be that the replay state data does not equal the second state, and accordingly processing proceeds to step 50. Step 50 sets the replay state data to the second state. Step 52 detects if the memory access instruction is a load. If the aborting memory access instruction is a load, then step 54 serves to return the data value stored within the syndrome register value 32 as the result of the aborting load instruction. Step 56 then retires the instruction by marking it as complete and processing returns to step 27. If the determination at step 52 is that the aborting memory access instruction is not a load, then step 54 is bypassed and processing proceeds directly to step 56 where the aborting memory access instruction, which in this case is a store, is retired and marked as complete.

It will be appreciated that the flow diagram illustrated in FIG. 2 includes some steps which are performed by hardware (e.g. by the exception handling circuitry 26) and some steps which are performed by software. In this example, the steps marked with "*" are performed by software using the exception handling program instructions. The other processing steps are performed under hardware control by the exception handling circuitry 26, and other elements within the data processing system 2 as acquired. It will be appreciated that in other embodiments different divisions between the steps which are performed in hardware and software may be used.

Figure 3:
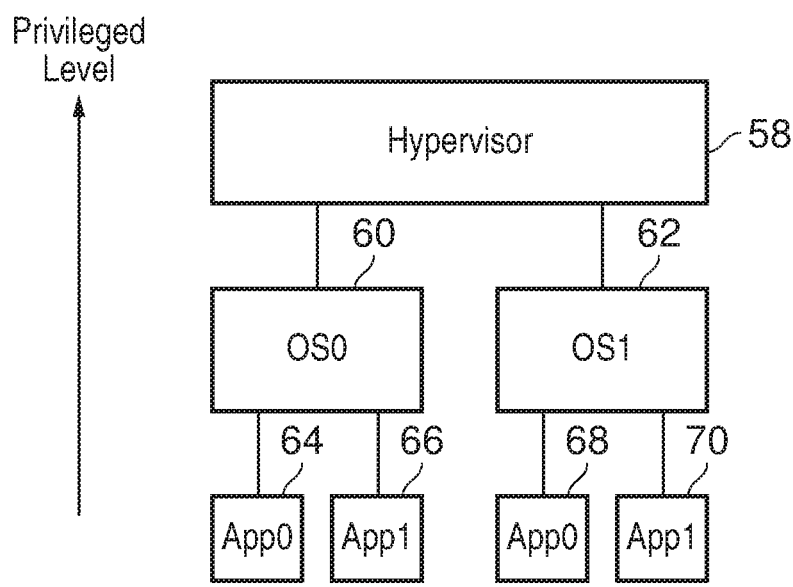
FIG. 3 is a diagram schematically illustrating a virtualisation program and guest programs.

FIG. 3 schematically illustrates the relationship between a virtualisation program, in the form of a hypervisor program 58, and guest programs in the form of guest operating systems 60, 62 and application programs 64, 66, 68, 70. The hypervisor program 58 operates at a higher level of privilege (exception level) than the guest programs 60-70. The hypervisor program 58 provides a virtualised execution environment for the guest programs 60-70. As part of this virtualised execution, the hypervisor program 58 provides virtual access to the input/output devices 10. The hypervisor program 58 may also virtualise access to other memory addresses or resources of the data processing system 2, such as system configuration registers. The present techniques utilising the syndrome register 32 may be used to provide for the emulation of other exception triggering processing operations by exception handling program instructions e.g. trapped accesses to system registers. In these cases, the emulation may also be performed using the syndrome data stored within the syndrome register 32 without requiring the emulation to have access to private data of the guest program. The data required to perform the emulation may be stored under hardware control into the syndrome register 32 from where it can be read by the emulating program instructions.

Figure 4:
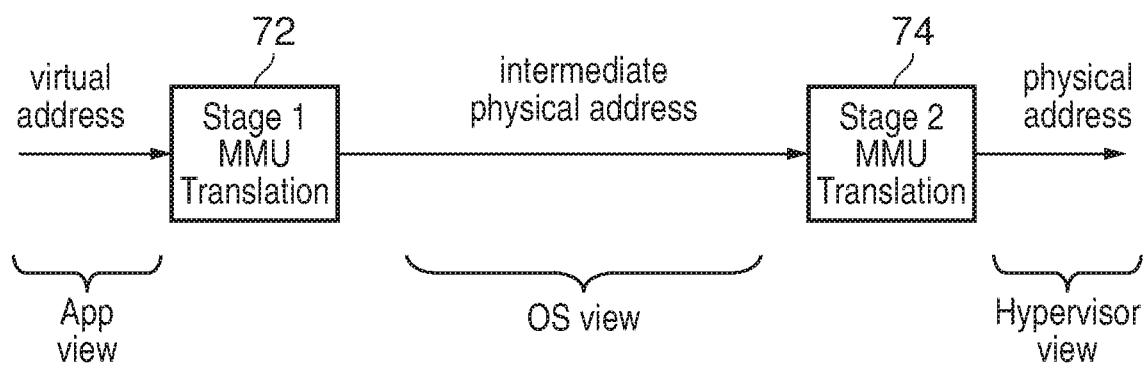
FIG. 4 schematically illustrates a two-stage virtual-to-physical address translation.

FIG. 4 schematically illustrates a two-stage address translation performed by the memory management unit 24. An application program 64, 66, 68, 70 may generate a memory access instruction using a virtual address. A first stage translation 72 is then performed by the memory management unit 24 using page table data controlled by the appropriate guest operating system 60, 62 to form an intermediate physical address corresponding to the physical address as provided by the guest operating system 60, 62. The guest operating system 60, 62 is itself executing in a virtualised environment and accordingly the memory management unit 24 performs a second stage translation 74 using page table data managed by the hypervisor 58 to produce a physical address which then addresses the memory address space including the memory 8 and the input/output devices 10. The physical address produced by the second stage translation 74 corresponds the hypervisors view of the physical memory address space.

The first stage translation 72 uses page table data managed by the guest operating system 60, 62. This first stage translation 72 may serve to block attempted memory accesses by the hypervisor program 58 to the private regions 13 within the memory 8 which are private to the guest operating system 60, 62 (or application programs 64-70). Even though the hypervisor program 58 has a higher level of privilege than the guest operating system 60, 62, the first stage translation 72 as managed by the guest operating system 60, 62 may block the hypervisor from accessing data. Page table data corresponding to the first stage translation 72 may be stored within the private region 13 to protect its security.

The second stage translation 74 is performed using page table data managed by the hypervisor program 58. This second stage translation data 74 may be used to trap memory accesses by the guest operating systems 60, 62 to memory addresses, such as the input output devices 10, that are controlled by the hypervisor program 58 and require emulation by the hypervisor program 58 using the syndrome register 32 and the syndrome data discussed above.

The above described example embodiments use the replay state data to control behaviour upon attempted re-execution of an exception triggering program instruction. Alternative example embodiments may not need to use such replay state data. In the case of the exception-triggering program instruction being a Store instruction, the exception handling program instructions may restart execution after the exception handling using the program instruction following the Store instruction (i.e. re-execution of the Store instruction is not attempted). In the case of the exception-triggering program instruction being a Load instruction, the need for use of the replay state data may be avoided by the provision and use of a new instruction at the end of the exception handling program instructions that controls the exception handling circuitry to blind copy the data value from the syndrome register to its intended destination register before returning execution to the instruction following the Load instruction.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
a plurality of registers;
exception handling circuitry to detect attempted execution of an exception-triggering processing operation including a transfer of a data value with a given register of said plurality of registers and to trigger execution of exception handling program instructions to at least partially emulate said exception-triggering processing operation; and
a syndrome data store to store syndrome data characterising said exception-triggering processing operation and including said data value; wherein
said exception handling circuitry performs said transfer with said given register using said data value within said syndrome data;
said syndrome data comprises replay state data having a first state and a second state;
when said replay state data has said second state and upon attempted execution of said exception-triggering processing operation, said exception handling circuitry sets said replay state data to said first state, and triggers execution of said exception handling program instructions;
when said replay state data has said first state and upon attempted execution of said exception-triggering processing operation, said exception handling circuitry sets said replay state data to said second state, suppresses triggering of said exception handling program instructions and signals said exception-triggering processing operation as complete.

2. Apparatus as claimed in claim 1, wherein
said exception-triggering processing operation is a load operation to transfer said data value from a memory address to said given register;
said exception handling program instructions transfer said data value from said memory address to said syndrome data store; and
said exception handling circuitry transfers said data value from said syndrome data store to said given register upon attempted re-execution of said load operation.

3. Apparatus as claimed in claim 1, wherein
said exception-triggering processing operation is a store operation to transfer said data value from said given register to a memory address;
said exception handling circuitry transfers said data value from said given register to said syndrome data store upon said attempted execution of said load operation; and
said exception handling program instructions transfer said data value from said syndrome data store to said memory address.

4. Apparatus as claimed in claim 1, wherein when said replay state data has said first state and upon attempted execution of said exception-triggering processing operation, said exception handling circuitry transfers said data value from said syndrome data store to said given register.

5. Apparatus as claimed in claim 1, wherein upon completion of said exception handling program instructions, said exception handling circuitry triggers attempted re-execution of said exception triggering processing operation.

6. Apparatus as claimed in claim 1, wherein said syndrome data is part of current program status data saved and restored upon exception entry and exit.

7. Apparatus as claimed in claim 1, wherein said exception-triggering processing operation triggers a data abort.

8. Apparatus as claimed in claim 1, wherein a program instruction corresponding to said exception-triggering processing operation is part of a guest program and said exception handling program instructions are part of a virtualisation program providing an execution environment for said guest program.

9. Apparatus as claimed in claim 8, comprising a memory management unit to manage access to a memory in dependence upon mapping data including first stage mapping data and second stage mapping data, wherein said guest program manages said first stage mapping data, said virtualisation program manages said second stage mapping data, and said exception-triggering processing operation is detected using said second stage mapping data.

10. Apparatus as claimed in claim 8, wherein said virtualisation program is blocked from access to private state data of said guest program.

11. Apparatus as claimed in claim 10, wherein said private state data includes data values within said plurality of registers during execution of said guest program.

12. Apparatus as claimed in claim 10, wherein said first stage mapping blocks access to said private state data of said guest program by said virtualisation program.

13. Apparatus as claimed in claim 1, wherein said transfer is between said given register and an input/output device.

14. Apparatus as claimed in claim 1, wherein said syndrome data comprises address data indicating a memory address, and said transfer of said data value is between said given register and said memory address.

15. Apparatus as claimed in claim 1, wherein said syndrome data comprises size data of said data value.

16. Apparatus as claimed in claim 1, wherein said syndrome data specifies if said transfer is a load of said data value to said given register or a write of said data value from said given register.

17. Apparatus as claimed in claim 1, wherein said syndrome data store is a syndrome register.

18. Apparatus for processing data comprising:
a plurality of register means for storing data;
exception handling means for detecting attempted execution of an exception-triggering processing operation including a transfer of a data value with a given register means of said plurality of register means and for triggering execution of exception handling program instructions to at least partially emulate said exception-triggering processing operation; and
syndrome data storage means for storing syndrome data characterising said exception-triggering processing operation and including said data value; wherein
said exception handling means performs said transfer with said given register means using said data value within said syndrome data;
said syndrome data comprises replay state data having a first state and a second state;
when said replay state data has said second state and upon attempted execution of said exception-triggering processing operation, said exception handling means sets said replay state data to said first state, and triggers execution of said exception handling program instructions; and
when said replay state data has said first state and upon attempted execution of said exception-triggering processing operation, said exception handling means sets said replay state data to said second state, suppresses triggering of said exception handling program instructions and signals said exception-triggering processing operation as complete.

19. A method of processing data comprising:
storing data within a plurality of registers;
detecting attempted execution of an exception-triggering processing operation including a transfer of a data value with a given register of said plurality of registers;
triggering execution of exception handling program instructions to at least partially emulate said exception-triggering processing operation; and
storing syndrome data characterising said exception-triggering processing operation and including said data value; and
performing said transfer with said given register using said data value within said syndrome data;
said syndrome data comprises replay state data having a first state and a second state;
when said replay state data has said second state and upon attempted execution of said exception-triggering processing operation, said detecting attempted execution sets said replay state data to said first state, and triggers execution of said exception handling program instructions; and
when said replay state data has said first state and upon attempted execution of said exception-triggering processing operation, said detecting attempted execution sets said replay state data to said second state, suppresses triggering of said exception handling program instructions and signals said exception-triggering processing operation as complete.

* * * * *